United States Patent [19]
Schlagel

[11] Patent Number: 5,803,695
[45] Date of Patent: Sep. 8, 1998

[54] GRAIN DISTRIBUTION APPARATUS AND METHOD

[75] Inventor: William A. Schlagel, Coon Rapids, Minn.

[73] Assignee: Schlagel, Inc., Cambridge, Minn.

[21] Appl. No.: 372,315

[22] Filed: Jan. 13, 1995

Related U.S. Application Data

[63] Continuation-in-part of Ser. No. 227,063, Apr. 13, 1994, abandoned.

[51] Int. Cl.[6] .................................................. B65G 11/00
[52] U.S. Cl. .............................................. 414/301; 193/23
[58] Field of Search ...................................... 414/299, 301, 414/273; 193/1, 22, 23, DIG. 1; 474/16; 280/259, 260, 26

[56] References Cited

U.S. PATENT DOCUMENTS

| | | |
|---|---|---|
| 2,217,037 | 10/1940 | Abramoska . |
| 3,339,691 | 9/1967 | Schlagel . |
| 3,557,924 | 1/1971 | Schlagel . |
| 3,762,525 | 10/1973 | Loveall et al. ............................. 193/23 |
| 3,780,887 | 12/1973 | Bottoms . |
| 3,827,578 | 8/1974 | Hough . |
| 3,874,490 | 4/1975 | McAlister . |
| 4,044,633 | 8/1977 | Lee . |
| 4,058,199 | 11/1977 | Schlagel . |
| 4,173,154 | 11/1979 | Sawmiller et al. . |

FOREIGN PATENT DOCUMENTS 13961 of 1899 United Kingdom ................... 280/261

OTHER PUBLICATIONS

4 page brochure "Gerber Roto–Flo".

*Primary Examiner*—Thomas J. Brahan
*Attorney, Agent, or Firm*—Palmatier, Sjoquist, Helget & Voigt

[57] ABSTRACT

A grain distribution apparatus and method is disclosed for positive positional control of the providing distribution of grain among a plurality of receiving ducts. A housing contains a distribution spout rotated by a drive motor among discharge positions at each receiving duct. A control wheel connected to the spout rotates with the spout to a selected discharge position. The control wheel has a plurality of sensible code clusters and position proof windows, one of each for each discharge position. Each code cluster has a unique series of data digits and a series of sequencing digits adjacent the data digits. The data digits and sequencing digits are serially read by a sensor. The sensor is connected to a control processor for identifying the position of the spout. The control wheel is configured as a driven sprocket and is engaged by the upper portion of a double wide roller chain around the entire periphery of the control wheel. A planetary driver sprocket connected to a drive motor is engaged with the lower portion of the roller chain. The drive motor is controlled by the control processor. When a specific receiving portion is selected the control processor operates the drive motor until the sensor senses the code cluster corresponding to the selected receiving portion. After sensing said cluster the motor stops. The sensing of a position proof window at the sensor confirms the spout is properly position at a receiving portion.

38 Claims, 9 Drawing Sheets

GRAIN DISTRIBUTION APPARATUS AND METHOD

This is a Continuation-in-Part Application of U.S. patent application Ser. No. 08/227,063 filed on Apr. 13, 1994, now abandoned.

BACKGROUND OF THE INVENTION

This invention relates to material handling apparatus. More particularly, the invention relates to position control in a grain distribution apparatus.

Grain distribution apparatus control the distribution of grain from one or more input ducts connected to grain sources among several receiving or output ducts. Although grain distribution apparatus may take various configurations, typically a distribution spout is connected to the grain source by way of the input spout and is moveable among several open ends connecting to output ducts. The environment within such distribution apparatus is unavoidably laden with grain dust. Several significant problems are inherent where the positional control of the distribution is controlled by conventional electrical switching in the apparatus. First, the dust can interfere with the operation of such switches, affecting the switches mechanical operation and/or interfere with the electrical contacts. The dust can also create a highly explosive atmosphere. Sparks associated with the electrical contacts of such switches can present a significant hazard.

Additionally, conventional switching for monitoring of the position of the distribution apparatus requires a multiplicity of switches and extensive wiring between the apparatus and the remote control location. Extensive wiring increases the potential of short circuits and breaks in the wiring, all of which can contribute to high maintenance, difficulty in making repairs, and can also increase the explosion hazard.

Conventional position sensing in grain distribution apparatus utilize relative position sensing in which the distribution spout is rotated a specific number of increments or for a specific duration of time from a main marker location to find a desired discharge position. Sensors are utilized to identify each increment and do not independently identify each discharge position. Moreover, no verification of the correct placement of the spout at the discharge position or at the correct discharge position is provided. If an increment is missed or if the motor does not operate correctly the spout may not be properly positioned. This can result in misplacement, waste, loss, or inefficient transfer of the grain. Additionally no provisions are provided for continual monitoring of the correct positioning of the spout during and after grain transfer.

Similarly, the dust has an adverse impact on the mechanical drive systems of grain distribution apparatus. Minimization of the moving parts and simplicity of design are desirable for high reliability and to facilitate the maintenance on such apparatus.

SUMMARY OF THE INVENTION

A grain distribution apparatus and method is disclosed for positive positional control of the providing distribution of grain among a plurality of receiving ducts. A housing contains a distribution spout rotated by a drive motor among discharge positions at each receiving duct. A control wheel connected to the spout rotates with the spout to a selected discharge position. The control wheel has a plurality of sensible code clusters, one for each discharge position. Each code cluster has a unique series of data digits and a series of sequencing digits adjacent the data digits. The data digits and sequencing digits are serially read as the digits pass by a sensor comprised of a first sensor unit and a second sensor unit respectively. The sensor units are connected to a control processor for identifying the position of the spout. The control processor allows the data digits to be read only when a sequencing digit is being read.

When a particular discharge position is desired the control processor operates the drive motor until the data digits corresponding to the desired discharge position has been sensed by the sensor. The control processor then continues to operate the drive motor for a predetermined period of time and then stops the motor at which point the discharge spout ideally will be properly positioned at the selected discharge position.

The coded portion has a position proof window or digit for each coded portion. Each proof window is positioned on the coded portion so as to be confronting the sensor when the discharge spout has been properly positioned at each discharge position. The sensor detects the proof window to confirm that the discharge spout has been properly positioned. The sensor continues to monitor that the discharge spout maintains its proper positioning during and after grain transfer.

A feature of the invention is that each discharge position has a unique identifiable code cluster. This offers an advantage that the position of the discharge spout is positively identified at each coded cluster. This can minimize the time for changing the discharge position of the spout.

A further feature of the invention is that each code cluster has a position window proof to confirm the proper positioning of the discharge spout at each discharge position after repositioning and continually thereafter until the discharge spout is repositioned.

An object and advantage of the invention is that a minimum number of lead wires are needed for connecting the sensor to the control processor.

An object and advantage of the invention is that remote control of the grain distribution apparatus is provided that does not need conventional electrical switching within the apparatus.

An object and advantage of the invention is that inductive sensing may be utilized to determine the positioning of the distribution spout within the apparatus, avoiding the disadvantages of conventional electrical switching such as limited life expectancy of conventional switching.

An additional object and advantage of the invention is that the invention utilizes a minimal number of moving parts associated with the position sensing.

An additional object and advantage of the invention is to provide a drive system that is simple in design and uses a minimal number of operational parts.

An object and advantage of the invention is that inductive sensors may be located inside the apparatus that operate on very low power to avoid the explosion hazards of conventional sensing.

An additional object and advantage of the invention is to provide an apparatus in which the drive system and the position indicating portion of the apparatus are closely coupled and utilize common elements.

An additional feature of the invention is a chain and sprocket arrangement in which the drive sprocket and driven sprocket are eccentrically arranged with the drive chain wrapped entirely around and stationary on the driven sprocket. This minimizes design space requirements, wear on parts, and the number of parts. There is no take-up adjustment for the chain and the chain wear is minimized.

DETAILED DESCRIPTION OF THE PREFERRED EMBODIMENTS

Figure 1:
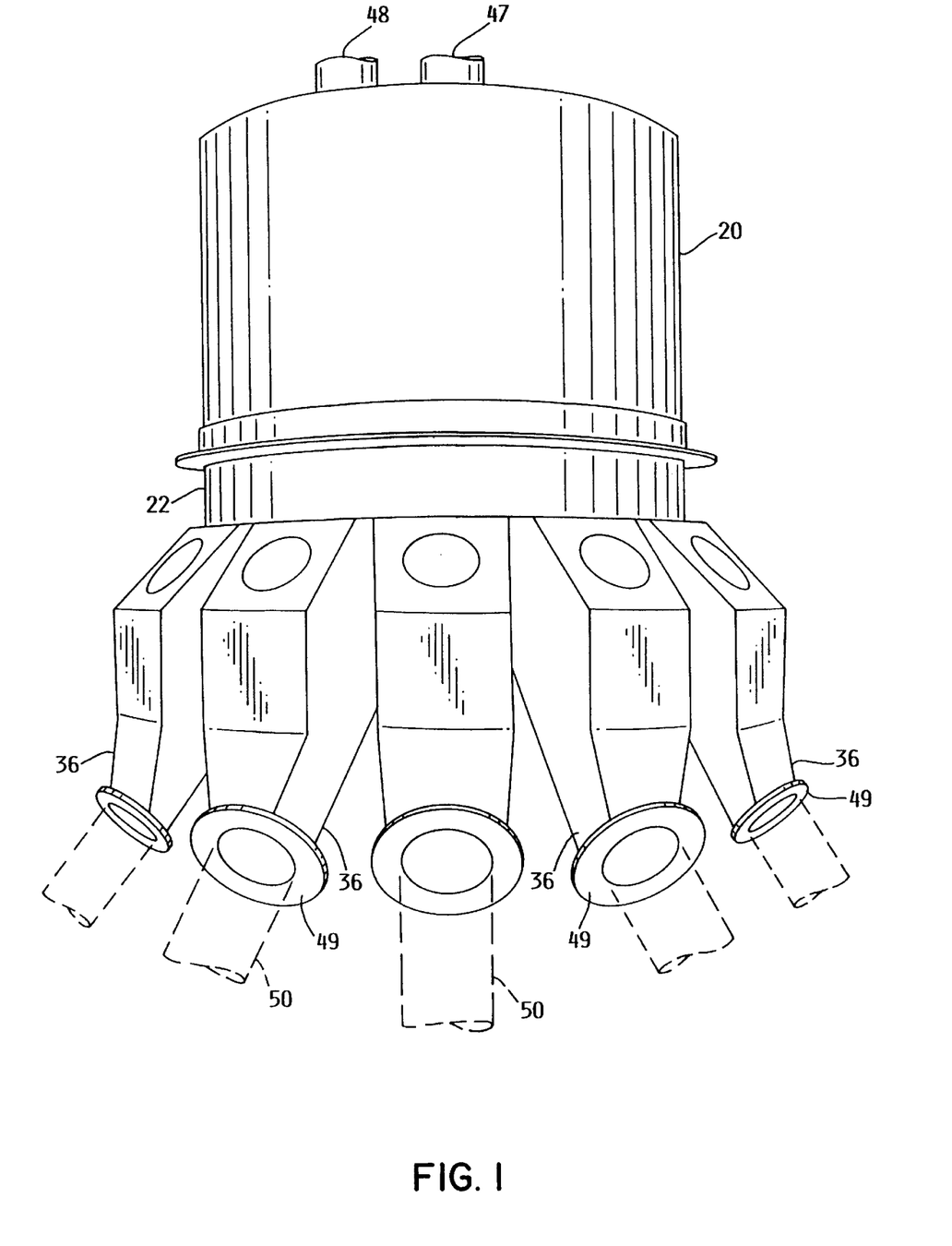
FIG. 1 is a perspective of an embodiment of the invention with a cylindrical housing, two distribution ducts, and circularly arranged receiving ducts.
Figure 2:
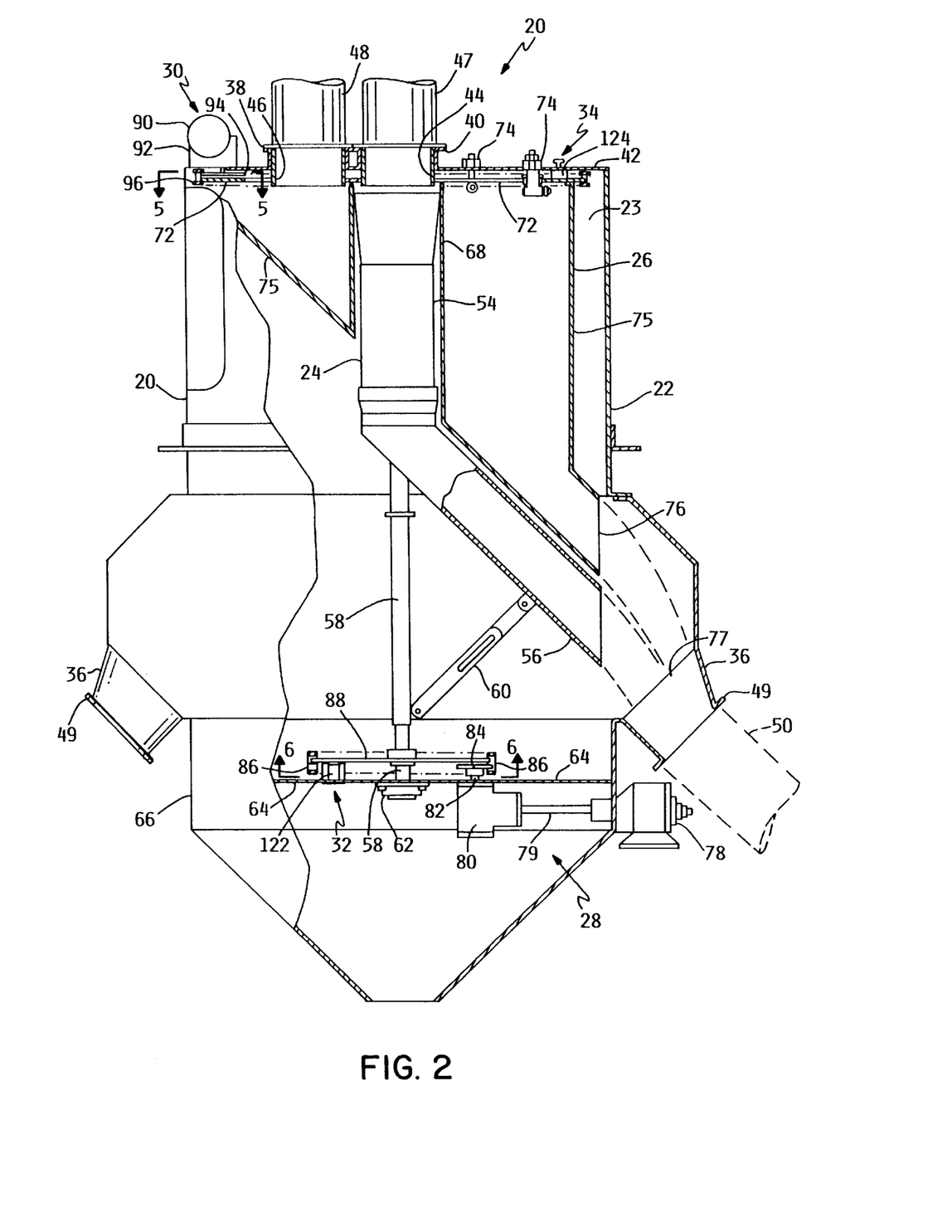
FIG. 2 is a partial sectional elevational view of the embodiment of FIG. 1.

Referring to FIGS. 1 and 2, a grain distribution apparatus is shown and is generally indicated by the numeral 20. The apparatus has a substantially cylindrical housing 22 having an open interior 23, within which is contained a pivotal inner distribution spout 24 which is embraced by a pivotable annular distribution spout 26. The inner distribution spout 24 is rotated by way of a drive means 28. Similarly, the annular distribution spout 26 is rotated by a second drive means 30. Position sensing of the inner distribution spout 24 is provided by way of an inductive sensing means 32 and similarly a second inductive sensing means 34 is provided for the annular distribution spout 26. A plurality of receiving ducts 36 is shown extending downwardly from the housing 22. When used herein, "pivotal" is intended to be broadly construed and includes "rotatable" within its meaning.

The grain distribution apparatus, as shown in FIGS. 1 and 2, is connectable to two grain sources, not shown, by way of two flanges 38, 40 which extend from the top 42 of the housing 22 and connect respectively to the receiving end 44 of the inner distribution spout 24 and the receiving end 46 of annular distribution spout 26. Connecting duct work 47, 48, connect the flanges 38, 40 to the two grain sources. The receiving ducts 36 similarly have flanges 49 for attachment of connecting duct work 50, shown in phantom lines, for transporting the distributed grain to selected bins, not shown, or elsewhere as desired. The housing and duct work may be fabricated from sheet metal or plate stock by conventional means.

Referring to FIG. 2, the inner distribution spout 24 is comprised of the receiving end 44, a pivoting portion 54, and a discharge end 56. The pivoting portion 54 is rotatably supported by way of a shaft 58 which is coaxial with the housing 22 and further supported by way of an angular bracing 60 which connects between the discharge end 56 and the shaft 58. The shaft 58 is rotatably mounted on a bearing block 62 which is attached to a support plate 64 located at the bottom 66 of the housing 22. The pivoting portion 54 may be axially constrained by the inner wall 68 of the annular distribution spout 26.

Figure 3:
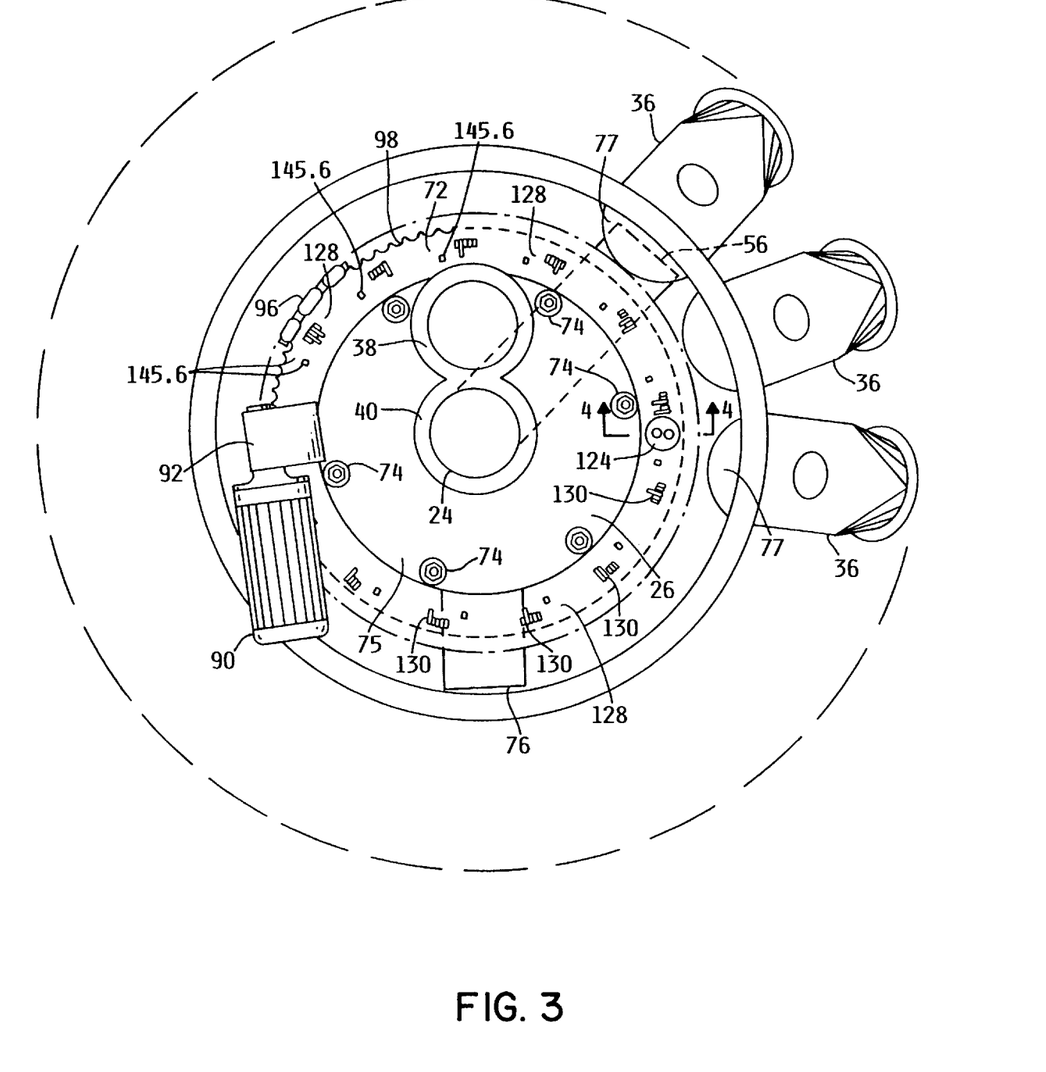
FIG. 3 is a top view of the embodiment of FIG. 1 with the top removed to reveal the inductive sensors and the annular control wheel with embedded code clusters.

The annular distribution spout 26 also pivots in a rotational sense and is rotatably supported by way of attachment to an annular control wheel 72 located adjacent to the top 44 of the housing 22. The annular control wheel 72 is ring-shaped and is supported by way of a plurality of support roller guides 74 attached to and extending downwardly from the top 44 of the housing as shown in FIG. 2 and may be generally positioned as shown in FIG. 3. The annular distribution spout 26 is comprised of the receiving end 46, a rotatable portion 75 which attaches to the annular control wheel 72, and the discharge end 76.

The discharge end 56 of the inner distribution spout 24 and the discharge end 76 of the annular distribution spout 26 are thus independently rotatable within the cylindrical housing among the receiving ducts 36. Each receiving duct 36 has a receiving portion 77 into which the grain is poured from the discharge ends 56, 76. Each pivotal or rotational position of the discharge ends 46, 76 when directed into the receiving portion 77 of each receiving duct 36 defines a pivotal or rotational discharge position.

The drive means 28, 30 for the inner distribution spout 24 and the annular distribution spout 26 are generally shown in FIG. 2 and have portions shown in greater detail in FIGS. 3, 4, 5 and 6. Referring first to the drive means 28 for the inner distribution spout 24, a motor 78 is mounted externally of the housing 22 and connects to a shaft 79 in the interior of the housing which connects to a right angle drive 80 mounted to the support plate 64. A shaft 82 extends out of the right angle drive 80 and connects to a drive sprocket 84. The drive sprocket is engaged to a double-wide chain 86 which extends around and is engaged with a control wheel 88 which is configured as a driven sprocket. The control wheel or drive sprocket 88 is fixed to the control shaft 58 whereby rotation of the control wheel 88 also rotates shaft 58 and thus causes the pivoting portion 54, and the discharge end 56 of the inner distribution spout 24 to rotate among the various receiving portions 77 of the receiving ducts 36.

The drive means 30 has a similar configuration with a motor 90 mounted external the housing 22 and directly connected to a right angle drive 92. Extending downward from the right angle drive 92 is a shaft and drive sprocket 94 which is engaged to a second double-wide chain 96. The double-wide chain 96 is simultaneously engaged with the control wheel 72 which is also configured as a sprocket.

The motors 78, 90, as shown, are conventional electric motors however hydraulic or even pneumatic motors may also be suitable. Additionally, the drive means may also comprise a power take-off arrangement rather than utilizing a direct drive motor. A one-half horsepower three-phase electric motor with an electromechanical brake is generally suitable for this application.

Referring specifically to FIG. 3, a top plan view of the apparatus is shown with the top 42 of the housing 22 removed disclosing the positioning and configuration of the ring-shaped control wheel 72. The motor 92 and the support roller guides 74 are shown suitably positioned, although it should be noted that the motor 92 and roller guides 74 are attached to and supported by the top 52 and the top 52 has been removed in this view. The flanges 38, 40 and discharge ends 56, 76 for the inner distribution spout 24 and the annual distribution spout 26 are shown in this view. The rotatable portion 75 of the annular distribution spout 26 funnels down towards the discharge end 76. The double-wide chain 96 is shown encompassing and engaged with the entire periphery 98 of the control wheel 72.

Figure 4:
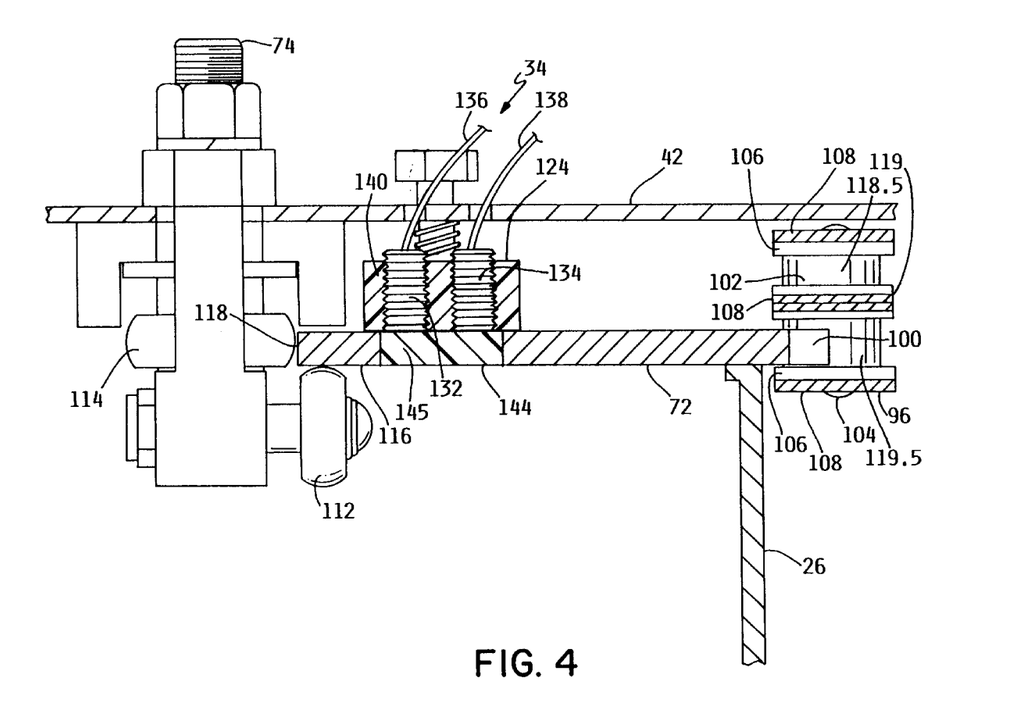
FIG. 4 is a cross-sectional detail of a portion of the annular ring with one of the support roller guides, the inductive sensors, and the double-wide drive chain.
Figure 5:
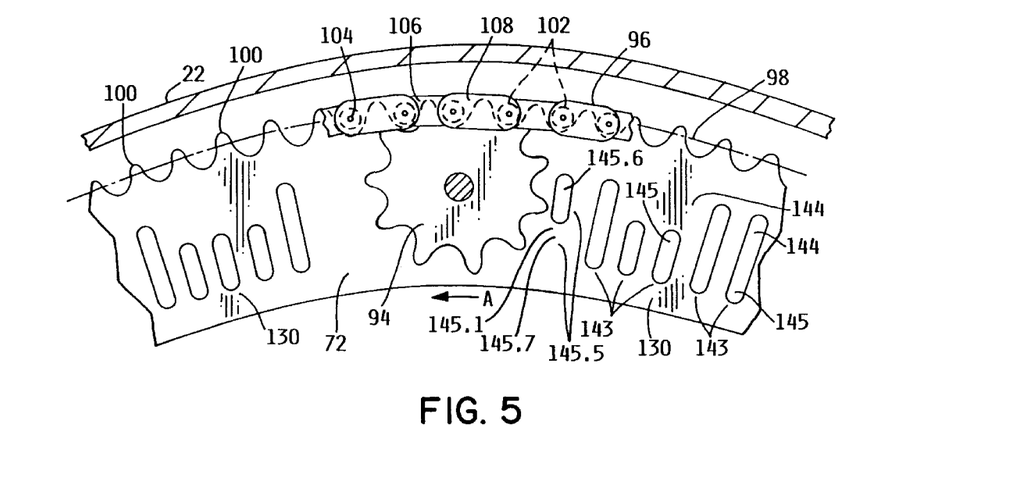
FIG. 5 is a sectional view taken at plane 5—5 of FIG. 2 of a portion of the control wheel and the drive sprocket with the double wide chain engaged.

FIGS. 4 and 5 show details of the engagement by the double-wide chain 96 with both the control wheel 72 and the drive sprocket and shaft 94. The control wheel 72 has a periphery 98 with a plurality of teeth 100 which engage the chain 96. FIG. 4 shows a cross-sectional view of the chain 96 and control wheel 72. The double-wide roller chain 96 is conventional in nature and is comprised of a plurality of rollers 102 and pins 104 with pairs of rollers 102 connected by roller link plates 106 and pairs of pins connected by pin connecting plates 108. FIG. 4 also shows a support roller guide 74. Each guide 74 has a vertically mounted roller 112 and a horizontally mounted roller 114 which engage the lower surface 116 and the inside edge surface 118 of the control wheel 72 for supporting and guiding the rotation of the control wheel 72 and correspondingly the rotatable portion 75 and end 76 of the annular distribution spout 26.

Referring to FIGS. 4 and 5, the double wide chain 96 has a first portion 118.5 and a second portion 119.5 which are divided by center links 119. The first portion 118.5 is engaged by the drive sprocket 94 not shown in FIG. 4, and the second portion 119.5 engages the driven sprockets which are the control wheel 88, 72. The sprocket and roller chain may be appropriately sized as best shown in FIG. 4 so that the sprockets fit constrictively within the respective portion of the chain 96. The constrictive fit minimizes movement of the chain on the control wheel and thus minimizes chain and sprocket wear.

Figure 6:
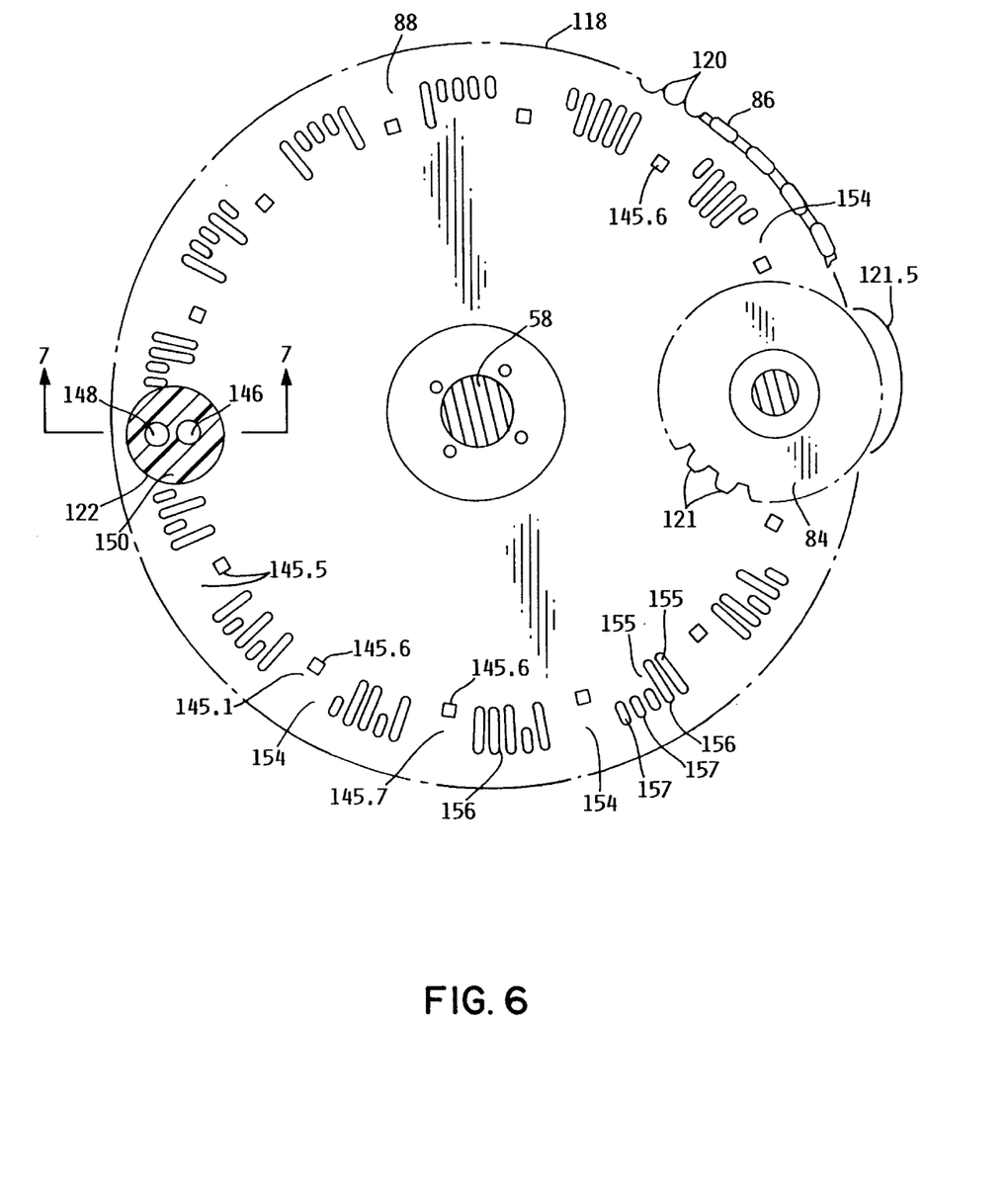
FIG. 6 is a sectional view taken at plane 6—6 of FIG. 2 showing a bottom view of the control wheel with the code clusters, the drive sprockets, the drive chain, and the inductive sensors.

FIG. 6 shows a partial sectional view taken at plane 6—6 of FIG. 2 showing the control wheel 88 configured as a driven sprocket which rotates the pivoting portion 54 and discharge end 56 of the inner distribution spout 24. The control wheel 88 has a periphery 118 which has a plurality of teeth 120 for engaging the double-wide chain 86. The drive sprocket 84 has similarly spaced teeth 121 relative to the control wheel 88. Both the control wheel 88 and the drive sprocket 84 are engaged with the double-wide drive chain 86 simultaneously at the region denoted by the numeral 121.5.

Referring again to FIG. 2, the sensing means 32, 34 for sensing the rotational position of the inner distribution spout 24 and the annular distribution spout 26 are shown. The sensing means 32 for the inner distribution spout 24 is comprised of an inductive sensor 122 and the control wheel 88. The inductive sensor 122 is suitably attached to a support plate 64 and extends upwardly to confront the control wheel 88. Similarly, the inductive sensing means 34 for the annular distribution spout 26 is comprised of an inductive sensor 124 and the control wheel 72. The sensor 124 extends downwardly from the top 44 of the housing 22 to confront the control wheel 72.

Referring to FIGS. 3, 4, 5 and 6, the elements of the sensing means 32, 34 are shown in greater detail. FIG. 3 shows the annular control wheel 72 which includes a coded portion 128 that extends circularly around the ring-shaped control wheel 72. Within the coded portion 128 are code clusters 130 each of which are positioned for and correspond to a rotational discharge position of the annular distribution spout 26. The inductive sensor 124 is oriented toward the control wheel 72 and the control wheel 72 is configured so that as the control wheel 72 is rotated, the inductive sensor 124 is maintained over the coded portion 128 of the wheel 72 and the code clusters 130 rotate past the sensors 124. FIG. 4 shows a detail of the inductive sensor 124 confronting the control wheel 72 of the annular distribution spout 26. Inductive sensor 124 is comprised of a first sensor unit 132 and a second sensor unit 134 with lead wires 136, 138 extending from each sensor unit through the top 42 and out of the housing 22. The sensor units 132, 134 are contained within a housing 140 which is made of a suitable nonferrous material such as very high molecular weight (VHMW) plastic. Two screws 141, one which is shown in FIG. 4, in conjunction with springs 142 may be utilized to maintain the sensor housing 140 in contact with the control wheel 72. A suitable inductive sensor would be a model Bi 2-P12-80 available from Turck, Inc., 3000 Campus Drive, Minneapolis, Minn. 55441.

FIG. 5 shows a detail of two code clusters 130 on the annular control wheel 72. Each code cluster 130 is comprised of five pairs 143 of digits and identifies a particular discharge position of the spout. The five pairs 143 of digits of each code cluster comprise an outer data digit 144 and an inner sequencing digit 145. Each discharge position also has a position proof window 145.1 comprised of a pair of digits 145.5 comprised of an inner first digit 145.6 and a outer second digit 145.7. The pair of position proof digits 145.5 are slightly distanced from the other pairs of digits 143 and are positioned to be in alignment with the sensor 124 when the discharge spout 26 is appropriately aligned with the discharge position corresponding to any particular code cluster.

The digits 144, 145, 145.6, 145.7 are binary digits where a hole in the coded portion equates to "1" and no metal removed equates to "0". That is, the presence of the base material of the coded wheel constitutes a "0". For this embodiment the sequencing digits in each code cluster always have the value of "1". There are no "0" sequencing digits. The presence of a sequencing digit 145 designates the presence of an adjacent data digit 144. The inner position proof digit 145.6 is positioned to be read by the first data digit sensor unit and has a binary value of "1". The outer position proof digit 145.7 is positioned to be read by the second or sequencing digit sensor unit and in this embodiment has the binary value of "0". Significantly, the position proof windows 145.1 are the only digit pairs on the coded portions in which the first sensor unit 132 reads a "1" and the second sensor unit 134 reads a "0"

The digits 144, 145, 145.6, 145.7 may be formed by cutting appropriately sized holes into the coded portion 128 of the control wheel 72 or by any similar means in which the "0" and "1" digits are differentiated as sensed by the sensor.

Referring the FIG. 4, the cross-section of the annular control wheel 72 shows the two "1" digits 144, 145 of a code cluster positioned immediately below the sensor units 132, 134 of the inductive sensor 124. In this figure, the more inwardly positioned sensor unit 132 is utilized for sensing the sequencing digits 145 and the more peripherally positioned sensor unit 134 is utilized for sensing the data digits 144. The digits 144, 145, as shown when designating a "1" are filled with a nonferrous material. The digits 144, 145, when representing "0", have no metal removed.

Figure 7:
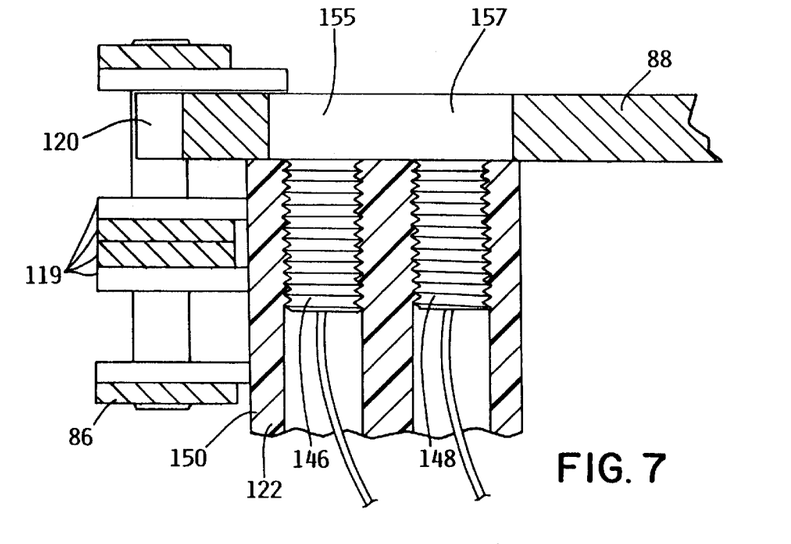
FIG. 7 is a cross-section detail view taken at plane 7—7 of FIG. 6 showing sensor units of an inductive sensor and two digits of a code cluster.
Figure 8:
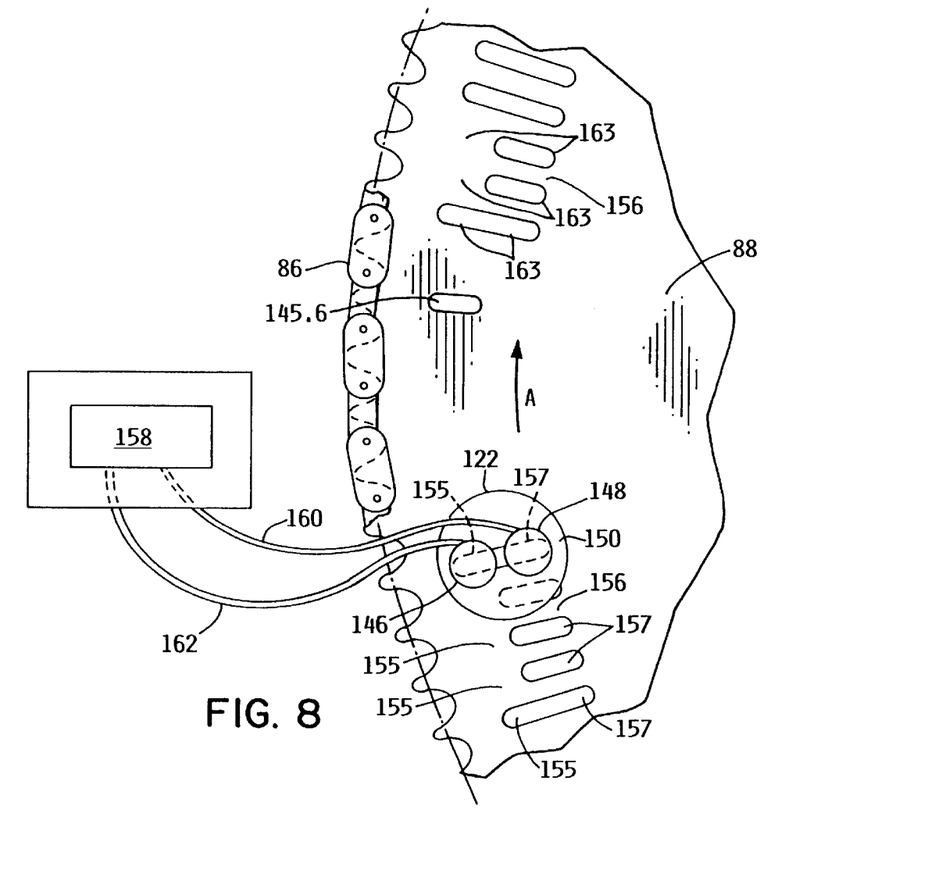
FIG. 8 is a diagrammatic bottom view of the control wheel showing the arrangement of the inductive sensors with respect to the code cluster and showing the sensors connected to the control processor.

Referring to FIGS. 6, 7, and 8, details of the sensing means 32 for the inner distribution spout 24 are shown. The inductive sensing means 32 comprises the inductive sensor 122 and the control wheel 88. The inductive sensor 122 includes a first sensor unit 146 and a second sensor unit 148 enclosed in a nonferrous housing 150. The control wheel 88 for the inner distribution spout 24 also has a coded portion 154 which includes code clusters 156 and associated position proof windows 145.1 positioned in a circular arrangement around the control wheel 88. The inductive sensor 122 is positioned on the support plate 64, and the control wheel 88 is configured so that the two sensor units 146, 148 are positioned to sense the code clusters 156 as the control wheel 88 is rotated.

Note that the control wheels 72, 88 of FIGS. 3 and 6 show the data digits 155 more inwardly positioned and FIGS. 4, 5, 7, and 8 show the sequencing digits 157 more inwardly positioned on the control wheels. Either positioning is suitable.

FIG. 7 shows a detail drawing of the inductive sensor 122 confronting the control wheel 88. Two digits 155, 157, one above each sensor unit 146, 148 are positioned immediately above the inductive sensor 122. The digits 155, 157 as shown, each representing a "1" constitute apertures in the control wheel 88 and are not filled with material in this embodiment.

FIG. 8 shows a bottom view of the inductive sensor 122 with the two sensor units 146, 148 positioned at the two digits 155, 157 with the sensor units 146, 148 electrically connected to a control processor 158 by way of lead wires 160, 162. Each code cluster 156 is comprised of five pairs of digits 163. Each pair 163 includes an outer data digit 155 and an inner sequencing digit 157. The more inwardly positioned sensor unit 148 is utilized for sensing the sequencing digits 157 and the more peripherally positioned sensor unit 146 is utilized for sensing the data digits 155.

Figure 9:
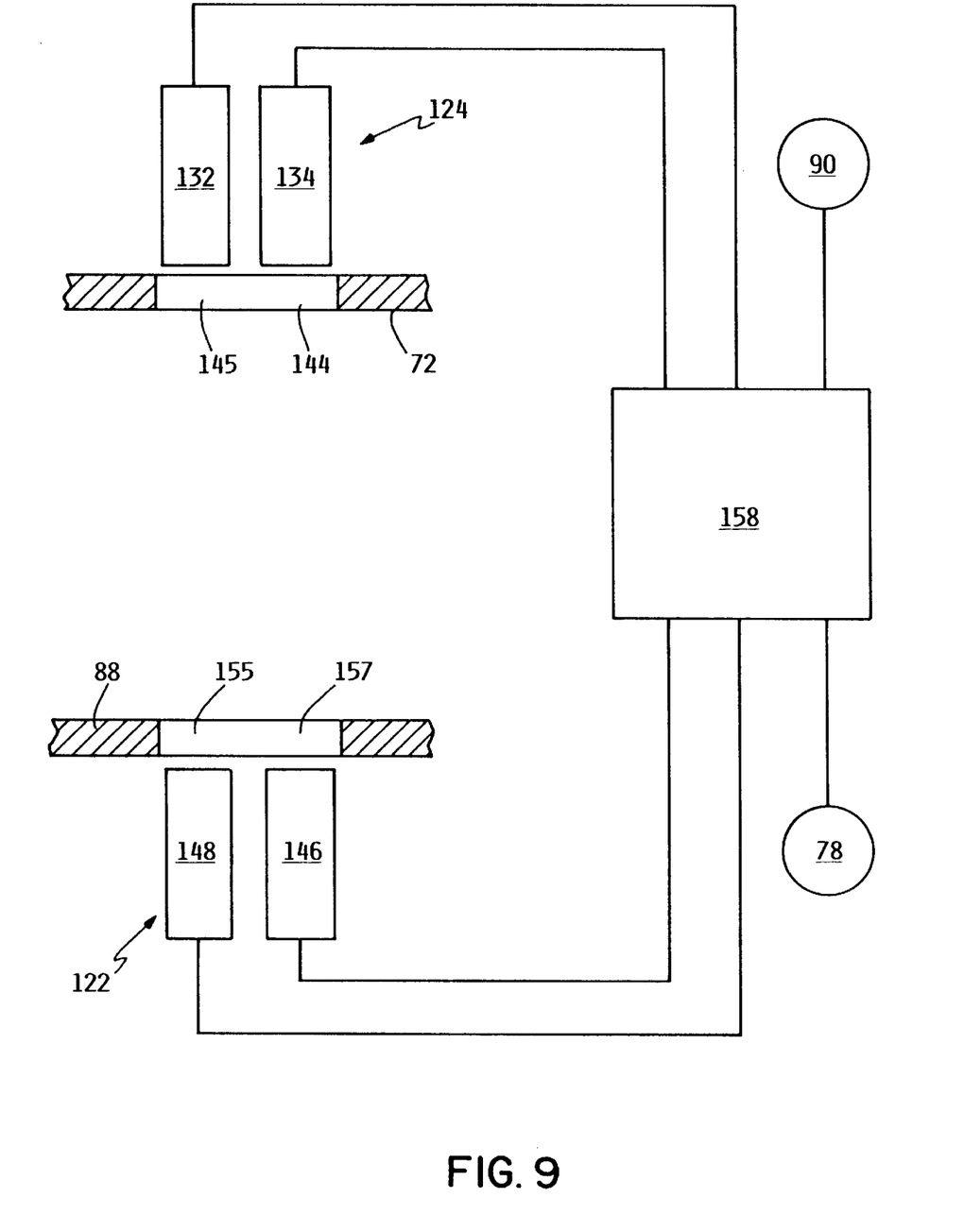
FIG. 9 is a diagrammatic view showing both inductive sensors and the drive motors connected to the control processor.

Referring to FIG. 9, a diagrammatic view of the two inductive sensors 122, 124 is shown including the individual sensor units 132, 134, 146, 148 electrically connected to the control processor 158. Additionally, the electric motors 78 and 90 also are electrically controlled by control processor 158.

Figure 10:
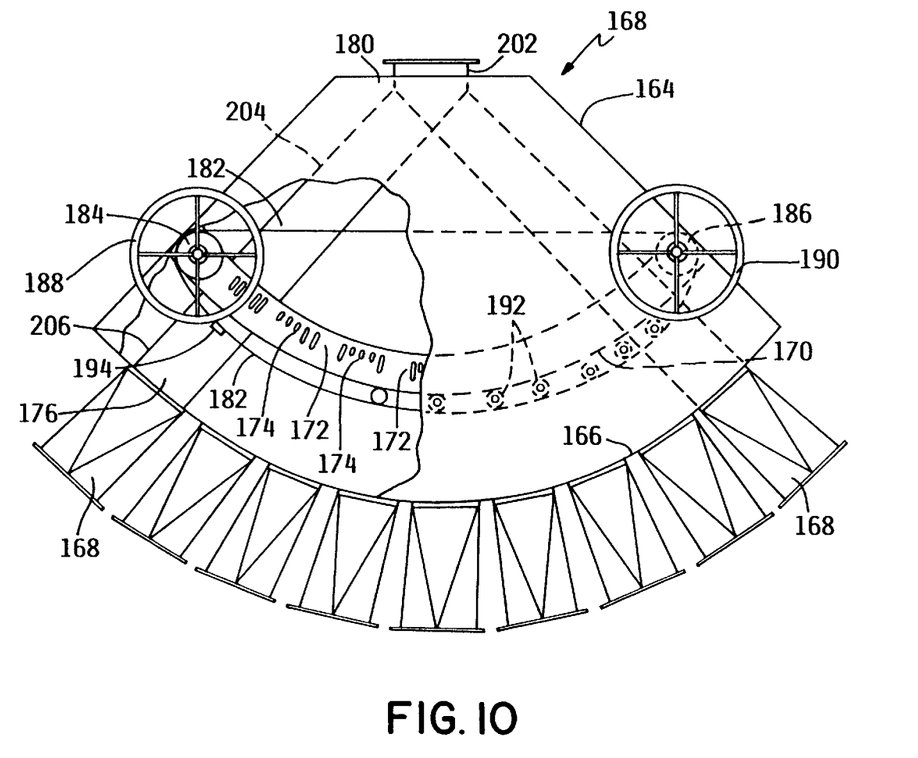
FIG. 10 is a front elevational view of an alternate embodiment of a grain distribution apparatus configured in a "swingset" arrangement, and with the coded portion arranged on an arcuate strip.
Figure 11:
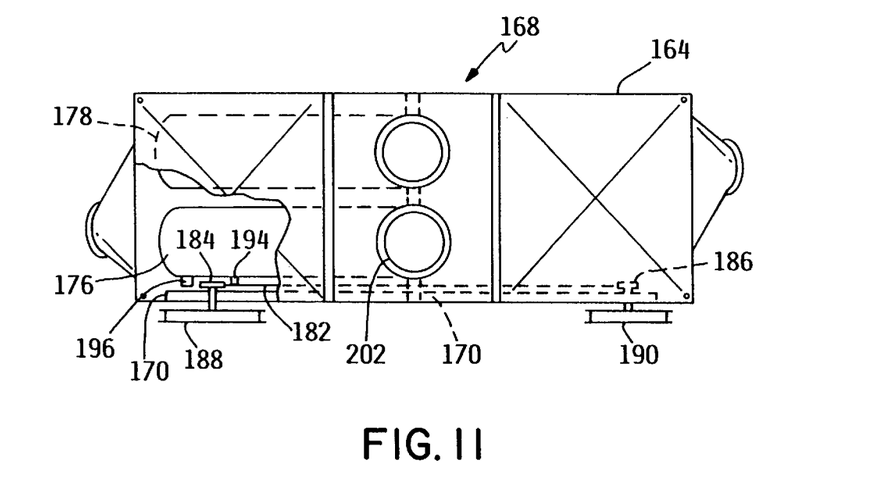
FIG. 11 is a top view of the embodiment of FIG. 10 with the inductive sensors attached to the pendant distribution duct and the arcuate strip attached to the side of the housing.

Referring to FIGS. 10 and 11, an additional alternative embodiment of the apparatus is shown in which the housing 164 is somewhat pie-shaped and includes an arcuate lower portion 166. This type of grain distribution apparatus is known in the industry as a "swingset" or "pendulum" distributor and is generally indicated by the numeral 168. FIG. 10 has a portion of the front of the housing broken away to reveal an arcuate control strip 170 which includes a coded portion 172 with code clusters 174. The swingset style distributor has two swinging distribution spouts 176, 178 which pivot by suitable means at the top 180 of the housing 164. The swinging distributor spouts 176, 178 are movable by way of chains one of which is shown in FIGS. 10 and 11 and is designated by the numeral 182. This chain 182 extends between sprockets 184, 186 which are respectively attached to additional sprockets 188, 190. The chain 182 extends in an arcuate manner by way of guides 192 which are attached to the housing 164. The swinging distribution duct 176 is anchored to the chain 182 by way of a bracket 194. Positioned on the swinging distribution duct 176 is an inductive sensor 196, as shown in FIG. 11, which confronts the coded portion 172 of the control strip 170. The code clusters may be of similar design as described in the previous embodiment. Rotation of the additional sprockets 190, 188 by suitable means, such as electric motors will swing the distribution duct along the arcuate lower portion 166 whereby any desired receiving duct may be selected. Similar to the previous embodiment, the distribution spout is comprised of a receiving end 202, a pivoting portion 204, and a discharge end 206.

Figure 12:
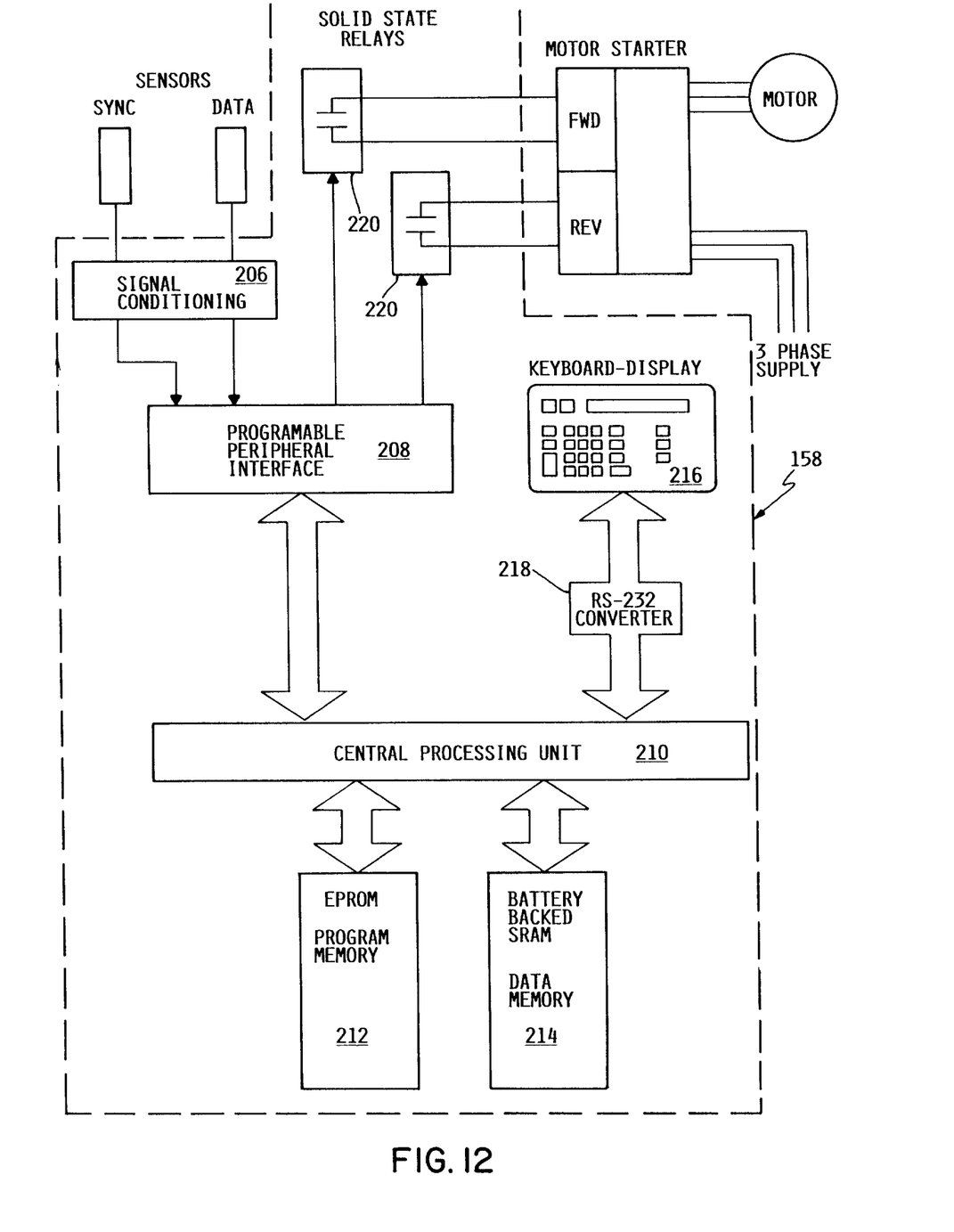
FIG. 12 is a diagrammatic view of the control processor.

Referring to FIG. 12, a diagrammatic figure of a suitable configuration of the control processor 158, is shown. The control processor circuitry is conventional and comprises signal conditioning circuitry 206, a programmable peripheral interface 208, a central processing unit 210, program memory 212, data memory 214, a keyboard/display 216, an RS-232 converter 218, and solid state relays 220 for controlling the motors. Suitable design and programming details would be apparent to those learned in the art.

The apparatus operates as follows: Referring to FIG. 2, the apparatus is connected to grain sources by the connecting duct work 47, 48 and the receiving ducts are connected to desired bins or other grain destinations. With suitable programming in place in the control processor, a specific receiving duct is selected for either the inner distribution spout 24 or the annular distribution spout 26. The appropriate motor is activated by the control processor 158 to rotate either the annular control wheel 72 or the control wheel 88 for the inner distribution spout 24. For purposes of this explanation of operation the annular control wheel will be utilized. With the activation of the motor 90, the sprocket and shaft 94 rotate and, by way of their engagement with the double-wide chain 96 which is engaged with the annular control wheel 72, the annular control wheel also rotates. Connected to and extending downward from the annular control wheel 72 is the pivotal or rotatable portion 75 and the discharge end 76.

With five data digits in each code cluster, a unique numeric value between one (1) and thirty-two (32) has been assigned to each of the code clusters to correspond to a rotational discharge position. This data is stored in the control processor 158.

Referring to FIG. 6, each code cluster 156 shown in FIG. 6 is comprised of five sequencing digits 157 and five data digits 155. Each digit represents the binary numbers "0" or "1" by way of the presence or absence of metal respectively. The "0" digits are simply comprised of the base material of the control wheel 88. As the control wheel 88, shown in FIGS. 2, 3, 4, and 5, moves past the inductive sensor 122, the second sensor unit 148 senses when a sequencing digit 157 is in place below the inductive sensor 122. The first or data digit sensor unit 146 becomes operative by way of the control processor 158 to then read the paired binary data digit 155 which is then present under the sensor unit 146. The data digits 155 cause the sensor units to generate a signal comprising a pulse corresponding to a "1" and no pulse for an "0". The signal is transmitted to the control processor 158.

The five data digits 155 in a code cluster 156 have an assigned binary value of 1, 2, 4, 8, and 16 respectively. The data digits 144 are read or sensed in sequence and are only read when a sequencing digit 145, which is always a "1", is sensed. The control processor then arithmetically adds the assigned values of the data digits read as "1" to define the address or the positioning of the control wheel 72 and thus the distribution spout based on the code cluster 156 that has just passed under the inductive sensor 122. Significantly each code cluster 156 has a unique numeric value which is conventionally stored in the control processor 158. When the control processor 158 determines that the code cluster 156 with the assigned numeric value for the rotational position that it was searching for has passed under the inductive sensor 122, the control processor 158 stops the motor 90 driving the control wheel 72. At this point the discharge end 56 of the spout 24 should be in perfect alignment in the discharge position with the desired receiving portion 77 of the selected receiving duct 36. The control processor 158 may be configured and the code clusters 156 positioned to allow the motor 90 to operate for a predetermined amount of time rather than immediately stopping.

In such an alignment position, the code cluster corresponding to the selected discharge position will have moved past the sensor and the sensor will now be stopped over the position proof digits. The control processor will suitably acknowledge the proper positioning or activate an alarm if the discharge end or spout is not properly positioned. The width of the position proof digits may be suitably sized to accommodate any acceptable range of positioning of the discharge end of the spout at the receiving portion 77. The position proof digits thus provides a window of acceptable placement positions.

Moreover, the position proof digits or windows may monitor the continued proper positioning of the discharge end or spout during a grain transfer.

The grain source is opened allowing the grain to pass into the receiving end 46 and into the pivoting portion 75. The pivotal portion 75 of the annular distribution spout 26 operates as a funnel to direct the grain around the inner distribution spout 24 to the discharge end 76. The discharge end 76 then directs the grain to the open receiving portion 77 of the receiving duct 36.

The inner distribution spout 24 operates in a like manner. In the embodiment shown in FIGS. 1 and 2, positions for both the inner distribution spout 24 and the annular distribution spout 26 may be separately selected and the spout will rotate independent of each other.

Notably, the digits and code clusters may be formed from any suitable means in which a sensible code cluster as sensed by the selected sensor are produced. This may take the form of adding additional metal or metal of a different inductivity where inductive sensors are used.

Additionally, different sensing means other than inductive are contemplated and may be utilized with the invention. Conventional photoelectric sensing means, capacitive sensing means, and magnetic sensing means are highly suitable for the binary code system just described. In the embodiments described in detail above the digits are inductively differentiated and the inductive sensor units are the sensors. In other embodiments alternate digits could constitute other known ways of providing differentiations at the coded portions which would be sensed by other suitable sensors. These would include mechanical detents or fingers comprising the code clusters which would actuate mechanical switches, the switches constituting the sensors. Digits with differentiated light absorption characteristics could be used in conjunction with photoelectric or similar sensors. Magnets could be utilized for the "1" digits with reed switches or other magnetic sensing devices as the sensors.

It is further understood that innumerable variations of the coding system are available in which unique signals are generated for various rotational positions. Moreover, the code clusters may be positioned at more rotational positions than just the discharge positions. For example, unique code clusters may be placed at every 10° of rotation.

Significantly, the two inductive sensors and most other suitable sensors require a minimal number of leads to the control processor, typically two from each sensor unit.

The embodiment shown in FIGS. 10 and 11 operate in a similar fashion except that the arcuate control strip 170 which contains the coded portion 172 with the code clusters 174 is attached to the housing and the swingable distribution duct 176 has the inductive sensor 196 attached to it. The inductive sensor 196 then moves along the control strip 170 as the swinging distribution duct 176 is swung by way of the cable 182.

Moreover, the embodiments disclosed utilize a coded portion that is fixed to the pivoting spout that moves past a fixed sensor. It is also contemplated that the sensors may be fixed to the spout to move past a coded portion fixed to the housing. Thus where it is stated herein that the coded portion moves with respect to the sensor, either the sensor or the coded portion may be fixed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A grain distribution apparatus comprising:
   a. a housing with an open interior;
   b. a plurality of receiving ducts extending from the housing, each receiving duct having a receiving portion in the interior of the housing;
   c. an inner distribution spout pivotally moveable and stoppable among the receiving portions, the inner distribution spout having a plurality of pivotal positions;
   d. a drive motor connected to the housing and distribution spout for moving and stopping the distribution spout;
   e. a coded portion with a plurality of code clusters, each code cluster comprised of a unique series data digits indicative of a pivotal position of the distribution spout;
   f. a sensor configured to sense the differentiated data digits and generate corresponding signals, the sensor and coded portion connected to the distribution spout and housing such that the sensor confronts the coded portion and such that pivotal movement of the distribution spout moves the coded portion with respect to the sensor, the code clusters arranged such that the data digits of each code cluster move sequentially past the sensor whereby the code clusters are serially read; and,
   g. a control processor connected to the sensor, the control processor configured to receive the signals from the sensor and to determine the pivotal position of the distribution spout.

2. The apparatus of claim 1, wherein the sensor is comprised of an inductive sensor.

3. The apparatus of claim 1, wherein the sensor is fixed with respect to the housing and the coded portion is connected to and pivots with the distribution spout.

4. The apparatus of claim 1, wherein the coded portion is fixed with respect to the housing and the sensor is connected to and pivots with the distribution spout.

5. The apparatus of claim 1, wherein each pivotal position corresponds to a different receiving portion.

6. The apparatus of claim 5, wherein the control processor is connected to and controls the drive motor and the control processor is further configured to receive an inputted selection of a receiving portion for positioning of the distribution spout, the control processor further configured to operate said drive motor a predetermined amount of time after the code cluster corresponding to the unique pivotal position is read, whereby the distribution spout will be positioned over the selected receiving portion.

7. The apparatus of claim 1, wherein the code clusters each further comprise a series of sequencing digits disposed adjacent the data digits, and wherein the sensor comprises a first sensor unit positioned to read the data digits and a second sensor unit positioned to read the sequencing digits, the control processor further configured to receive signals from the first sensor only when the second sensor senses a sequencing digit.

8. The apparatus of claim 7, further comprising a plurality of pairs of position proof digits sensible by the sensor, positioned on the coded portion, and corresponding to a specific receiving portion, each pair comprising a first digit positioned to be sensed by the first sensor unit and a second digit positioned to be sensed by the second sensor unit when the distribution spout is in position at said specific receiving portion.

9. The apparatus of claim 7 wherein each code cluster is positioned to correspond to a specified pivotal position of the distribution spout, wherein each pivotal position is assigned a numerical value and wherein each pivotal position corresponds to a receiving portion.

10. The apparatus of claim 1, further comprising a plurality of position proof windows sensible by the sensor and positioned on the coded portion, each window corresponding to a specific receiving portion and positioned to be sensed by the sensor when the distribution spout is in position at said specific receiving portion.

11. The apparatus of claim 10 further comprising a driven sprocket connected to the distribution spout, a roller chain engaged on the entire periphery of the driven sprocket all at once, a drive sprocket rotatably mounted to the housing and eccentrically positioned with respect to the driven sprocket and engaged with the roller chain, whereby rotation of the drive sprocket rotates the driven sprocket and pivots the distribution spout.

12. The apparatus of claim 11, wherein each code cluster is comprised of a series of binary data digits representative of the assigned numerical value, and wherein the control processor is further configured to arithmetically add the binary data digits for determining the pivotal position of the discharge spout.

13. The apparatus of claim 12, wherein the control processor is connected to and controls the drive motor and the control processor is further configured to receive an inputted selection of a receiving portion for positioning of the distribution spout, the control processor further configured to operate said drive motor a predetermined amount of time after the code cluster corresponding to the unique pivotal position is read, whereby the distribution spout will be positioned over the selected receiving portion.

14. The apparatus of claim 1 further comprising a driven sprocket connected to the distribution spout, a roller chain engaged on the entire periphery of the driven sprocket all at once, a planetary drive sprocket connected to the drive motor, eccentrically positioned with respect to the driven sprocket, and engaged with the roller chain, whereby rotation of the drive sprocket rotates the driven sprocket and pivots the distribution spout.

15. A grain distribution apparatus comprising:
  a. a housing with an open interior;
  b. a plurality of receiving ducts extending from the housing, each receiving duct having a receiving portion in the interior of the housing;
  c. a distribution spout comprising a receiving end, a pivoting portion, and a discharge end, the receiving end connectable to a grain source, the pivoting portion pivotal with respect to the housing and configured so that the discharge end is movable among the receiving portions;
  d. a drive motor connected to the distribution spout for rotating the discharge end among and stopping at the receiving portions; and,
  e. a position sensing means connected to the inner distribution spout and fixed with respect to the housing, the position sensing means comprising:
    i) a coded portion having a plurality of sensible code clusters, each code cluster unique and corresponding to a specified pivotal position of the distribution spout, each pivotal position assigned a unique numerical value, each code cluster comprised of a sequence of binary data digits representative of the numerical value of the specified pivotal position;
    ii) a sensor confronting the coded portion whereby the pivoting of the pivoting portion moves the binary data digits of the coded clusters of the coded portion sequentially past the sensor to generate a serial binary signal as the distribution spout moves among the receiving portions;
    iii) a plurality of position proof digits, positioned on the coded portion, each position proof digit corresponding to a receiving portion, the position proof digits positioned such that the sensor senses a position proof digit when the distribution spout is in proper position with the corresponding receiving portion; and,
    iv) a control processor connected to the sensor, the control processor configured to receive the binary signals and to determine the pivotal positions of the distribution duct as said spout is being pivoted, the control processor further configured to determine if the sensor is at a position proof digit when the distribution spout is in position at a receiving portion.

16. A grain distribution apparatus of claim 15, wherein the sensor is an inductive sensor and the binary data digits and the position proof digits are comprised of inductively differentiated spaces on the coded portion.

17. a grain distribution apparatus comprising:
  a. a housing with an open interior;
  b. a plurality of receiving ducts extending from the housing, each receiving duct having a receiving portion in the interior of the housing;
  c. an inner distribution spout pivotally moveable and stoppable among a plurality of discharge positions, each discharge position located at a receiving portion;
  d. a coded portion and a sensor connected to the distribution spout and the housing such that pivotal movement of the distribution spout moves the coded portion with respect to the sensor, the coded portion comprised of a plurality of digits, each said digits sensible by the sensor;
  e. the digits comprising a plurality of code clusters, each code cluster unique with respect to each other and each code cluster indicative of a unique position of the inner distribution spout, whereby movement of the distribution spout moves the code clusters by the sensor whereby the sensor generates a signal indicative of the position of the spout as said spout is moving; and
  f. the digits further comprising a plurality of position proof digits distinct from the code clusters, each position proof digit corresponding to a specific discharge position of the distribution spout and positioned such that the sensor senses a position proof digit when the distribution spout is stopped at each discharge position.

18. The apparatus of claim 17, wherein each code cluster is sensible by the sensor and corresponds to a different discharge position of the distribution spout said code clusters positioned such that each of said code clusters is sensed before the distribution spout reaches the discharge position corresponding to each of said code clusters.

19. The apparatus of claim 18, further comprising a control processor connected to the sensor, the control processor configured to receive the signal from the sensor for identifying the location of the distribution spout.

20. The apparatus of claim 19 further comprising a drive motor connected to the distribution spout for pivotally moving the spout, the drive motor connected to and controlled by the control processor and wherein the control processor is further configured to receive an inputted selection of a receiving portion for positioning of the distribution spout, the control processor further configured to operate said drive motor a predetermined amount of time after the code cluster corresponding to the selected receiving portion has been read, whereby the distribution spout will be positioned at the selected receiving portion.

21. The apparatus of claim 18, further comprising a control processor connected to the sensor, the control processor configured to receive the signal from the sensor for indicating that distribution spout is in position at a receiving portion.

22. A grain distribution apparatus of claim 17, wherein the sensor is an inductive sensor and the position proof digits comprise inductively differentiated spaces on the coded portion.

23. The apparatus of claim 17 further comprising a driven planetary sprocket connected to the distribution spout, a roller chain engaged on the entire periphery of the driven sprocket all at once, a drive sprocket rotatably mounted to the housing and eccentrically positioned with respect to the driven sprocket and engaged with the roller chain, whereby rotation of the drive sprocket rotates the driven sprocket and pivots the distribution spout.

24. A grain distribution apparatus comprising:

a. a housing with an open interior;

b. a plurality of receiving ducts extending from the housing, each receiving duct having a receiving portion in the interior of the housing;

c. a distribution spout pivotally moveable and stoppable among the receiving portions, the inner distribution spout having a plurality of pivotal positions;

d. a drive means connected to the distribution spout for moving and stopping the distribution spout; and, e. a sensing means connected to the housing and the distribution spout for generating a unique signal for each pivotal position as the distribution spout is pivoted, the sensing means comprising a plurality of serially read binary code clusters, each code cluster indicative of a pivotal position of the distribution spout.

25. The apparatus of claim 24, wherein the sensing means further comprises a sensor and a plurality of position proof windows positioned on the coded portion, each window sensible by the sensor and corresponding to a different receiving portion, the position proof windows positioned to be sensed by the sensor when the distribution spout is positioned at each receiving portion.

26. The apparatus of claim 25, wherein the code clusters are also sensible by the sensor and are positioned to be sensed by the sensor.

27. The apparatus of claim 24, wherein the sensing means is comprised of an inductive sensor.

28. The apparatus of claim 24, wherein the code clusters each further comprises a series of data digits and a series of sequencing digits, the sequencing digits positioned adjacent the data digits, and wherein the sensing means comprises two sensor units, one sensor unit positioned to read the data digits and the other sensor unit positioned to read the sequencing digits, the apparatus further comprising a control processor, the control processor configured to receive data digits from the first sensor only when the second sensor is sensing a sequencing digit.

29. A method for positioning a pivoting distribution spout at a selected receiving portion among a plurality of receiving portions in a grain distribution apparatus comprising the steps of:

pivoting the distribution spout by a drive motor, the distribution spout and receiving portions being constructed and arranged so that the spout rotates by each receiving portion;

detecting when the spout is approaching each receiving portion by moving a plurality of serially read sensible code clusters on a coded portion, as the spout is pivoted, past a sensor, each code cluster unique and corresponding to a particular receiving portion; and, after detecting when the spout is approaching a particular receiving portion, stopping the pivoting of the spout to position the distribution spout at the selected receiving portion.

30. The method of claim 29 further comprising the step of:

delaying the stopping of the pivoting of the distribution spout for a predetermined period of time after the code cluster is sensed to properly position the distribution spout at the selected receiving portion.

31. The method of claim 29 further comprising the step of:

configuring each code clusters as a unique sequence of binary digits which are each serially read by the sensor.

32. The method of claim 31 further comprising the step of:

verifying that the distribution spout has been properly positioned over the selected spout by adding a plurality of sensible position proof windows to the coded portion such that the sensor reads a position proof window when distribution spout is properly positioned at each receiving portion.

33. The method of claim 29 further comprising the step of:

verifying that the distribution spout has been properly positioned over the selected spout by adding a plurality of sensible position proof windows to the coded portion such that the sensor reads a position proof window when the distribution spout is properly positioned at each receiving portion.

34. A method for verifying a pivoting distribution spout is properly positioned at a selected receiving portion in a grain distribution apparatus having a plurality of receiving portions, the method comprising the steps of:

providing the apparatus with a coded portion and sensor, the coded portion having a plurality of coded clusters sensible by the sensor, each unique to a receiving portion and a plurality of position proof digits, each sensible by the sensor and distinct from the coded clusters, the position proof digits positioned on the coded portion to be sensed by the sensor when the spout is properly positioned at a receiving portion;

pivoting the distribution spout by a drive motor;

sensing a selected receiving portion by sensing the code cluster unique to said selected receiving portion;

stopping the distribution spout; and verifying the proper position of the distribution spout by sensing a position proof digit.

35. An apparatus comprising:
a. a generally cylindrical grain distributor housing having an open interior,
b. A plurality of receiving ducts extending from the housing, each receiving duct having a receiving portion in the interior of the housing, the receiving ducts configured whereby the receiving portions are circularly arranged within the housing;
c. a distribution spout connectable to a grain source, the distribution spout connected to the driven sprocket and shaft, whereby the distribution spout is pivotally moveable among the receiving portions of the receiving ducts;
d. a driven sprocket and shaft rotatably mounted on the support structure, the driven sprocket having a periphery;
e. a roller chain encircling and engaging the entire periphery of the driven sprocket all at once; and
f. a driver sprocket and shaft rotatably mounted on the support structure eccentric with the driven sprocket and also engaging the chain.

36. The apparatus of claim 35, wherein the roller chain has a first portion and a second portion, the portions separated by a plurality of center links, the first portion engaged with the driven sprocket and the second portions engaged with the driver sprocket.

37. The apparatus of claim 35, wherein the roller chain has a first portion and a second portion, the portions separated by a plurality of center links, the first portion engaged with the driven sprocket and the second portion engaged with the driver sprocket.

38. The apparatus of claim 37, wherein the driven sprocket is comprised of a plurality of teeth and the first portion is sized to constrictively fit on the teeth of the driven sprocket.

* * * * *